(12) United States Patent
Ullmann

(10) Patent No.: US 8,756,529 B2
(45) Date of Patent: Jun. 17, 2014

(54) METHOD AND PROGRAM FOR MENU TREE VISUALIZATION AND NAVIGATION

(76) Inventor: Kay Dirk Ullmann, Framkfurt am Main (DE)

( * ) Notice: Subject to any disclaimer, the term of this patent is extended or adjusted under 35 U.S.C. 154(b) by 373 days.

(21) Appl. No.: 12/881,051

(22) Filed: Sep. 13, 2010

(65) Prior Publication Data
US 2012/0066647 A1    Mar. 15, 2012

(51) Int. Cl.
G06F 3/048    (2013.01)
(52) U.S. Cl.
USPC .......................... 715/841; 715/810; 715/825
(58) Field of Classification Search
None
See application file for complete search history.

(56) References Cited

U.S. PATENT DOCUMENTS

| | | | |
|---|---|---|---|
| 6,549,219 | B2 | 4/2003 | Selker |
| 6,636,244 | B1 * | 10/2003 | Kelley et al. ................. 715/781 |
| 7,036,091 | B1 | 4/2006 | Nguyen |
| 7,134,095 | B1 | 11/2006 | Smith et al. |
| 7,246,329 | B1 * | 7/2007 | Miura et al. ................. 715/810 |
| 7,676,763 | B2 | 3/2010 | Rummel |
| 7,712,049 | B2 | 5/2010 | Williams et al. |
| 7,725,835 | B2 | 5/2010 | Aaltonen |
| 7,812,824 | B2 | 10/2010 | Im et al. |
| 8,245,156 | B2 * | 8/2012 | Mouilleseaux et al. ...... 715/834 |
| 8,352,881 | B2 * | 1/2013 | Champion et al. ............ 715/834 |
| 2003/0112278 | A1 * | 6/2003 | Driskell ........................ 345/788 |
| 2005/0091609 | A1 * | 4/2005 | Matthews et al. ............. 715/804 |
| 2007/0180392 | A1 * | 8/2007 | Russo ............................ 715/765 |
| 2007/0256029 | A1 * | 11/2007 | Maxwell ....................... 715/834 |
| 2008/0215978 | A1 * | 9/2008 | Bamba .......................... 715/713 |
| 2009/0125845 | A1 * | 5/2009 | Lacock et al. ................ 715/841 |
| 2010/0124946 | A1 * | 5/2010 | Chun ............................. 455/566 |
| 2011/0055768 | A1 * | 3/2011 | Chen et al. ..................... 715/841 |

OTHER PUBLICATIONS

Adding Structure to Diagrams in Visio 2010, Aug. 2010, Nelson, Mark, Microsoft Corporation.*

* cited by examiner

*Primary Examiner* — Matt Kim
*Assistant Examiner* — Mahelet Shiberou
(74) *Attorney, Agent, or Firm* — Meyertons Hood Kivlin Kowert & Goetzel, P.C.; Jeffrey C. Hood; Joel L. Stevens

(57) ABSTRACT

A method and program that improves the efficiency of menu tree visualization and navigation in graphical user interfaces. Menu items are displayed as call-out shaped objects each made up of a call-out bubble and its leading arm. The leading arm connects the call-out bubble with the higher level menu item, the context-menu reference point or any other reference point on the user-interface screen. Menu lists are displayed as sets of similar-sized call-out shapes, which can be arranged in a variety of ways. A menu item can be selected by selecting either the leading arm or the call-out bubble of a call-out shape. The selection of a menu item through the selection of its leading arm significantly reduces the distance over which the pointer has to be moved for menu tree navigation. This is because the leading arm of each of the call-out shapes in any menu item list is close to the pointer's position immediately following the preceding selection process.

21 Claims, 12 Drawing Sheets

METHOD AND PROGRAM FOR MENU TREE VISUALIZATION AND NAVIGATION

FIELD OF THE INVENTION

The invention relates in general to computer systems with graphical user interfaces for human-machine interaction. More specifically, it relates to systems that use menu trees, in which menu items are displayed as call-out shaped objects and menu item lists are displayed as sets of similar sized call-out shaped objects.

DESCRIPTION OF THE RELATED ART

In today's computing environment information used for human-machine-interaction is typically displayed on a screen-type display; a keyboard and a pointing device are used for human interaction with the computing system. Menu-driven user interfaces through which users can specify options and have functions as well as applications performed by the computing system are common place. Menus of such menu-driven user interfaces are typically made up of a root-menu item list with several root-menu items. Each of these root-menu items typically represents another menu item list and so on over several levels. Together, a root-menu, its menu items, the menu lists contained in these menu items and their subsequent menu lists can expand over several levels to form hierarchical menu trees.

Root-menus are typically displayed as a horizontal list of root-menu items (at the top or at the bottom of an application program window) or as a list of vertically arranged root-menu items. Both horizontal and vertical root-menu lists are also referred to as root-menu bars. In order to select an item of the root-menu list, the user moves the pointing device and thus positions the pointer on the computing system's display over that particular item and selects the item through a pre-determined user-initiated action such as a left-click operation using the pointing device or the depressing of a suitable key on the keyboard. Each item is represented by a rectangular shape; several items are arranged in a linear way as sets of rectangular shapes that together form a menu item list or menu bar. Upon selection of such a root-menu item, typically another menu list is displayed either below or to one side of the selected root-menu item, taking the shape of a drop-down list. Such menu lists are typically arranged in a linear way. In some cases, the selection of a root-menu does not result in another menu list being displayed. Instead, it may result in a pop-up window being displayed or in the execution of a function or an application. In some cases the context of the specific situation does not allow for certain items to be selected but may allow so in a different context.

This approach is identical for so called 'context menus' where a drop-down menu list is shown at the cursor's current position upon a pre-determined user-initiated action, typically a right-click operation using the pointing device. In order to select one of the items shown in the item list, the user moves the pointing device, positions the pointer on the computing system's display over that particular item and selects the item through a left-click operation on the pointing device.

The difficulty with this approach, which uses horizontal and vertical menu item lists that are arranged in a linear way, is that the user often has to navigate the pointing device over a considerable distance in order to select a desired menu item. This is true in particular if the desired menu item is situated at the lower or far end of an item list. The problem is even more evident if the desired item can only be selected by navigating though several levels of menu lists, and even worse, if this is to be done repeatedly. As a result, the user can suffer a loss of time and stress to his/her wrist from repetitive strain.

SUMMARY OF THE INVENTION

The method and program that is provided improves the efficiency of menu tree visualization and menu tree navigation in multi-option, multi-level, hierarchical menu structures. The method achieves this by introducing a new visualization method for menu items and menu item lists, and by introducing a new menu item selection method.

At least some embodiments solve the above-described problems by displaying menu items as call-out shaped objects and menu item lists as sets of substantially similar-sized call-out shapes. Each call-out shaped object is made up of a call-out bubble and its leading arm, which can also be referred to as a call-out 'leader'. The call-out bubble contains a label or a symbol or both, which describe the function, application, pop-up window or subsequent menu item list that a particular call-out shape represents. The leading arm connects the call-out bubble with the higher level menu item or with the context-menu reference point that has been selected by the user. Menu lists are displayed as sets of similar-sized call-out shapes, which can be arranged in a variety of ways.

Depending on the number of items to be displayed, the space available on the user-interface screen and pre-selected user-display preferences, such sets of call-outs can take the shape of an upward or downward cascade, double cascades, an upside-down stepped pyramid or a fan, amongst many others.

Any desired menu item can be selected by positioning the pointer over either the bubble of a call-out shape or over its leading arm, followed by the user depressing a button on the pointing device or a suitable key on the keyboard. The selection of a menu item through the selection of its leading arm significantly reduces the distance over which the pointer has to be moved. This is because the leading arm of each call-out shape representing a particular menu item in a menu item list is very close to the position of the pointer immediately following the preceding menu item selection process. This significantly reduces the distance that the user has to move the pointing device for selecting a menu item for most items in any menu list.

Embodiments of the invention can be used for any type of hierarchical multi-item, multi-level menu tree. Such menu trees typically start with a root-menu bar or, in the case of context menus, with either a reference point displayed on the user-interface screen or with the cursor's current position.

Upon a pre-determined user action, typically a left-click operation using a pointing device over any root-menu item, over which the user positions the pointer on the user-interface screen, a list of next level menu items is displayed that is made up of a set of call-out shapes. This next level menu list can be shown to any side of the menu item selected by the user, depending on the space available on the user-interface screen.

If the menu tree to be accessed is a context menu, a menu list made-up of a set of call-out shapes appears to one or more sides of the pointer's current position or a reference point displayed on the user-interface screen following a pre-determined user action, typically a right-click operation. The individual call-out shapes are typically arranged below one another to form a cascade, line or arc of items. The leading arm of each call-out shape connects the root-menu item or reference point with the call-out bubble that the respective call-out represents.

If the user positions the pointing device over either a call-out bubble or its leading arm, the call-out (i.e. the bubble and its leading arm) may become highlighted or otherwise indicated, as is common in prior art. Similarly, if the pointer is hovered over a call-out bubble or its leading arm, a description associated with the hovered-over item may be displayed.

Upon a pre-determined user action (e.g. left-click) on this highlighted shape, e.g., on either the leading arm or the call-out bubble, the next level menu list appears to one or more sides of the call-out, applying the system and method of the present invention. Depending on the number of items to be displayed, the space available on the user-interface screen and pre-selected user-display preferences such sets of call-outs can take the shape of an upward or downward cascade, double cascades, an upside-down stepped pyramid or a fan, amongst many others. Any such arrangement can result in a cascade of items, two mirroring cascades, a pyramid, a fan or a radius so that they do not exceed the boundaries of the display area.

This visualisation of menu item lists as sets of call-out shapes and the selection of a desired item through a pre-determined user action on either the leading arm or the call-out bubble, can be repeated at each subsequent level to the menu tree. The user can thus navigate through the menu tree by positioning the pointer over the leading arm of a call-out shape or the call-out bubble and then selecting the desired item through a pre-determined user action on either the leading arm or the call-out bubble.

This method and system generally allows a user to navigate to a desired menu item within an arbitrarily deep hierarchy of menu items with a minimal movement of the user's pointing device. This method and system is most effective in cases where the desired menu item is situated at the far end of a menu item list or if the user has to navigate through several levels of the menu tree in order to arrive at the desired menu item. The method and system can be used for any type of hierarchical multi-option, multi-level menu tree in combination with a computer system-based, graphical user interface, a computer unit, and a pointing device.

Figure 1:
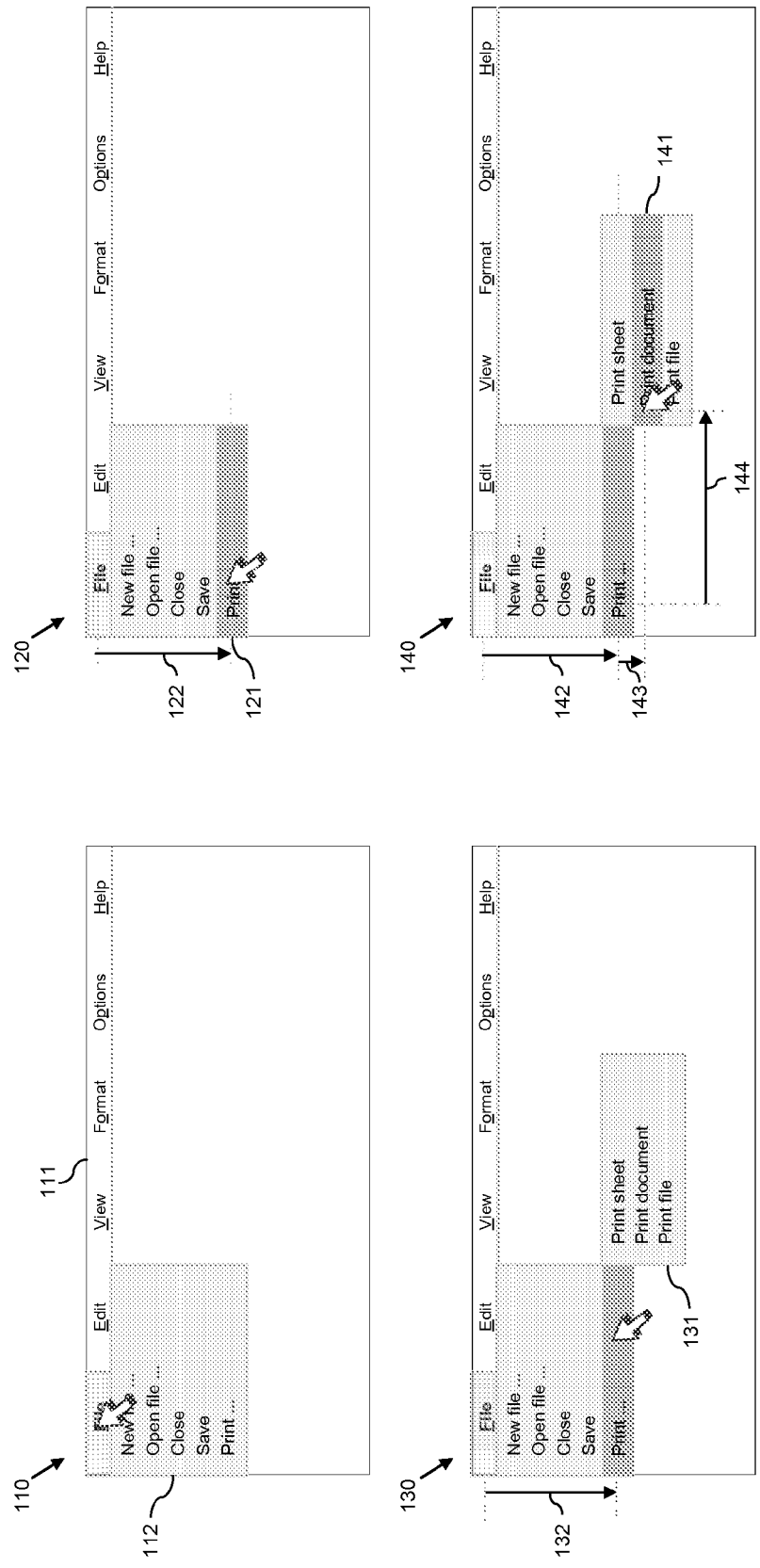
FIG. 1 represents a set of four exemplary screen shots 110 to 140 illustrating menu-driven user interfaces according to prior art.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

The following detailed description of the embodiments of the invention refers to the accompanying drawings in which, by way of illustration, it is shown how the embodiments of the invention may be practiced. Other embodiments may be utilised and structural changes may be made without departing from the scope of the present invention. Several exemplary embodiments of the invention are shown in order to describe the principal features of the invention in different suitable contexts. This is done by comparing the invention and its improvements over prior art to exemplary contexts, in which prior art is being utilized. Other suitable contexts are possible as well as modifications, adaptations and other implementations without departing from the spirit and scope of the invention. Accordingly, the following detailed description does not limit the invention. The proper scope of the invention is defined by the appended claims.

Embodiments of the invention may be implemented in and/or performed by a computer system. For example, embodiments of the invention may be implemented as a non-transitory computer-readable storage media comprising program instructions which are executable, e.g., by a computer system, to perform the operations as described herein. The method and program can be used in a computer system-based, graphical user interface that uses multi-option and multi-level menu structures in combination with a computer unit, pointing device and keyboard. One advantage of at least some embodiments of the invention is that by improving the efficiency of menu tree visualization and navigation it reduces the cursor movements required for menu tree navigation and menu item selection in menu trees.

Embodiments of present invention provide a method and program for visualizing individual menu items as call-out shaped objects and menu item list as sets of similar sized call-out shaped objects. Each menu item is displayed as a call-out shaped object. Each of these call-out shaped objects comprises a call-out bubble and its leading arm, which is also referred to as a call-out 'leader'. The leading arm connects the call-out bubble with the higher level menu item or with the context-menu reference point that has been selected by the user. Menu lists are displayed as sets of similar-sized call-out shapes, which can be arranged in a variety of ways. Depending on the number of items to be displayed, the space available on the user-interface screen and pre-selected user-display preferences such sets of call-outs can take the shape of an upward or downward cascade, double cascades, an upside-down stepped pyramid or a fan, amongst many others.

Embodiments of the present invention also provide a method and program for navigating through multi-item, multi-layer hierarchical menu trees that are visualised using sets of call-out shapes. Sets of call-out shapes can be arranged below each other, next to each other or on top of each other in order to visualise a hierarchy of menu items and menu lists. Any call-out shape and set of call-out shapes is displayed so that a maximum number of menu items of a menu item list can be displayed at once, taking into consideration the boundaries of the user interface screen and pre-selected user-display preferences.

Menu items in a menu item list may represent another, subsequent menu list ('sub-menu list'), a function, application or pop-up window. They can be selected by positioning the pointer over either the call-out bubble representing an item or the leading arm of that particular call-out shape, followed by the user initiating a pre-determined action, typically a left-click operation (often also a right-click operation) using a pointing device, or the depressing of a suitable key on the keyboard. This is the new selection method provided by at least some embodiments of the present invention.

Since the leading arm of a call-out connects the higher level menu item or reference point with the call-out bubble representing a specific menu item, embodiments of the present invention allow the user to access the desired menu item close to the higher-level menu item with a reduced navigation effort as measured by the distance that the user has to move the pointing device through a menu tree. The present invention therefore supports a more efficient access of the desired menu item, requiring only a minimal movement of the pointing device. It also provides a method for creating more visually pleasing menu lists.

FIG. 1 represents a set of four exemplary screen shots 110 to 140 illustrating prior art of menu-driven user interfaces, through which users can specify options and have pop-up windows, functions as well as applications performed by the computing system.

A root-menu list 111 is typically shown as a horizontal list of menu items, which is also referred to as a 'menu bar'. The user can select an item in this list by positioning a pointer using a pointing device (e.g. a computer mouse, trackball, touchpad, etc.) over the desired item and by initiating a pre-determined user action, typically a left-click operation using the pointing device or by depressing a suitable key on the keyboard. Items in the current focus of the pointing device may be highlighted as is common in prior art. If the pointer is hovered over a particular menu item, a description of the menu item may be shown.

Upon the selection of an item in the root-menu list, a subsequent menu list 112 is displayed, typically in the form of a drop-down vertical list of items. Each item in this list can represent another, subsequent menu list, a pop-up window, a specific function or an application to be executed. Of these, the user can chose one by positioning the pointer over this desired item 121 and by initiating a pre-defined user action, i.e. a left-click operation or sometimes a right-click operation using the pointing device or by depressing a suitable key on the keyboard. Items in the current focus of the pointing device may be highlighted. If the pointer hovers over a menu item, a description associated with the hovered-over item may be displayed. The distance that the user has to move the pointer and thus the pointing device is measured by 122.

If the desired menu item 121 represents a subsequent menu list, this menu list 131 is displayed, again taking the form of a vertical drop-down list of menu items. As with the previous menu list 112, the items in this list 131 can each represent either of the following: another, subsequent menu list, a pop-up window, a specific function or an application to be executed. In order to select the desired item 141, the user has to move the pointer to the right and down in order to position it over the desired item. The distance that the user has to move the pointer is measured by 143 and 144 in addition to 142. Both selected items 121 and 141 may become highlighted.

Those skilled in the art will recognise that the selected root-menu item and each subsequent menu list 112 and 131 may also become highlighted or shaded but differently from the menu items 121 and 141 that have been selected by the user. Those skilled in the art will also recognise that the process of displaying menu lists and selecting individual menu items can be repeated at many subsequent levels within a menu tree until the ultimate desired item has been selected. Upon selection of the final desired item within a menu tree, a pop-up window, a specific function or an application is executed and the chosen path of the menu tree disappears, with the exception of the root-menu bar, which is typically displayed permanently.

Figure 2:
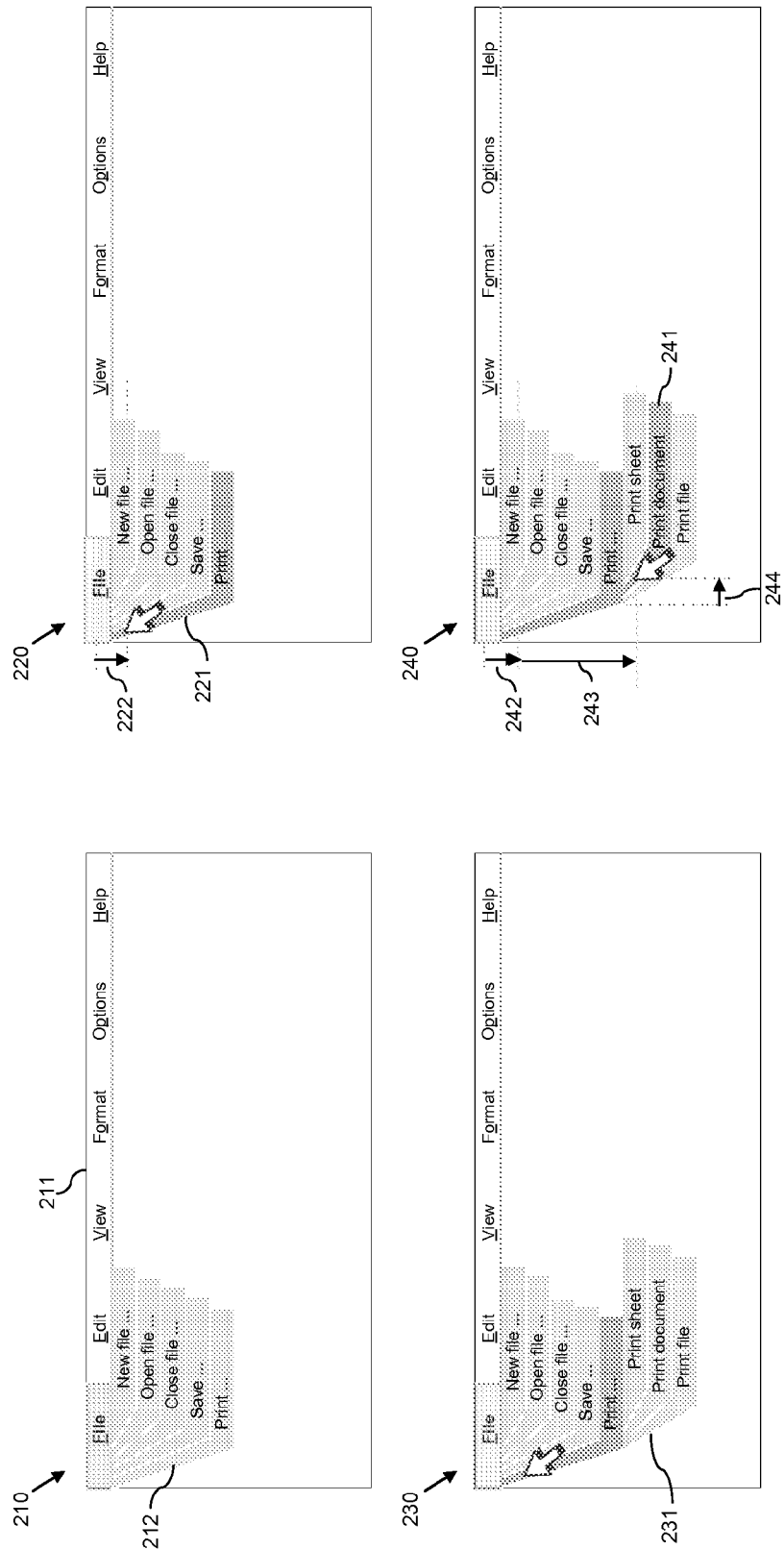
FIG. 2 represents a set of four exemplary screen shots 210 to 240 in accordance with an embodiment of the invention.

FIG. 2 represents a set of four exemplary screen shots 210 to 240 illustrating the principal approach of the invention and the first of its embodiments. The root-menu list 211 is, as with prior art, shown as a horizontal list of menu items, which the user can select, depending on the specific context. This is done by positioning a pointer over the desired item and by initiating a pre-determined user action, typically a left-click operation using the pointing device or the depressing of a suitable key on the keyboard. Upon such user-initiated action a subsequent menu item list 212 is displayed, taking the form of a set of similar-sized call-out shaped objects. For each of these call-out shaped objects, the call-out leader connects the root-menu item selected by the user with the call-out bubble of a particular call-out shape.

The visualization of each item in menu item list 212 as a call-out shaped object and the visualization of the menu item list as a set of substantially similar-sized call-out shapes represent the first embodiment of the present invention.

Such sets of call-out shapes can be arranged in a variety of ways. Depending on the number of items to be displayed, the space available on the user-interface screen and pre-selected user-display preferences such sets of call-outs can take the shape of an upward or downward cascade, double cascades, an upside-down stepped pyramid or a fan, amongst many others. This is a second embodiment of the present invention.

Another embodiment of the invention is represented by the fact that any menu item can be selected by positioning the pointing device over either the call-out leader of a call-out shaped object or over the call-out bubble, followed by a pre-determined user action, such as depressing a button on the pointing device or a suitable key on the keyboard.

Each of the menu items of menu list 212 can represent another, subsequent menu list (sub-menu list), a pop-up window, a specific function or an application to be executed. Of those items the user can chose one by positioning the pointer over the desired item 221 and by initiating a pre-defined user action using the pointing device or by depressing a suitable key on the keyboard. The user can position the pointer over the leading arm of a call-out shape or over its call-out bubble in order to be able to select a desired item 221, but in any way, the user only has to move the pointer over the leading arm of the desired item 221. The distance that the user has to move the pointer and thus the pointing device is measured by 222. Distance 222 is significantly shorter than distance 122 because the leading arm of the desired item 221 is close to the position of the pointer immediately after selection of the desired root-menu item, i.e. the previous menu item selected. This highlights a key merit of the invention.

If the menu item 221 represents a subsequent menu list, this sub-menu list 231 is displayed, again taking the form of a drop-down set of call-out objects. The visualization of the second level menu item list 231 as a set of similar-sized call-out shaped objects is another embodiment of the invention, as is the visualization of any subsequent sub-menu list (i.e. third-, fourth-, fifth-level and so on) as a set of substantially similar sized call-out shapes.

As with the previous menu list 212 and any subsequent menu list, the items in this list 231 may each represent another subsequent menu list, a pop-up window, a specific function or an application to be executed. In order to select the desired item 241 in this sub-menu list, the user has to move the pointer down and to the right in order to position it over to the desired item 241, represented by the call-out bubble and its leading arm. The distance that the user has to move the pointer is measured by 242, 243 and 244.

Since the leading arm of the desired item 241 connects the desired item with the menu item 221, which has just been selected, the user only has to move the pointer over the leading arm of the desired item 241. The distance that the user has to move the pointer and thus the pointing device as measured by 242, 243 and 244, is significantly shorter than distance 142, 143 and 144. This highlights a key merit of the invention.

All selected items 221 and 241 may become highlighted. The selected root-menu item and each subsequent menu list 212 and 231 may also become highlighted or shaded but usually in a different colour shade from the menu items 221 and 241 that have been selected by the user. If the user hovers over a menu item, a description associated with the hovered-over item may be displayed. This is an element common in prior art as will be easily recognised by those skilled in the art.

Figure 3:
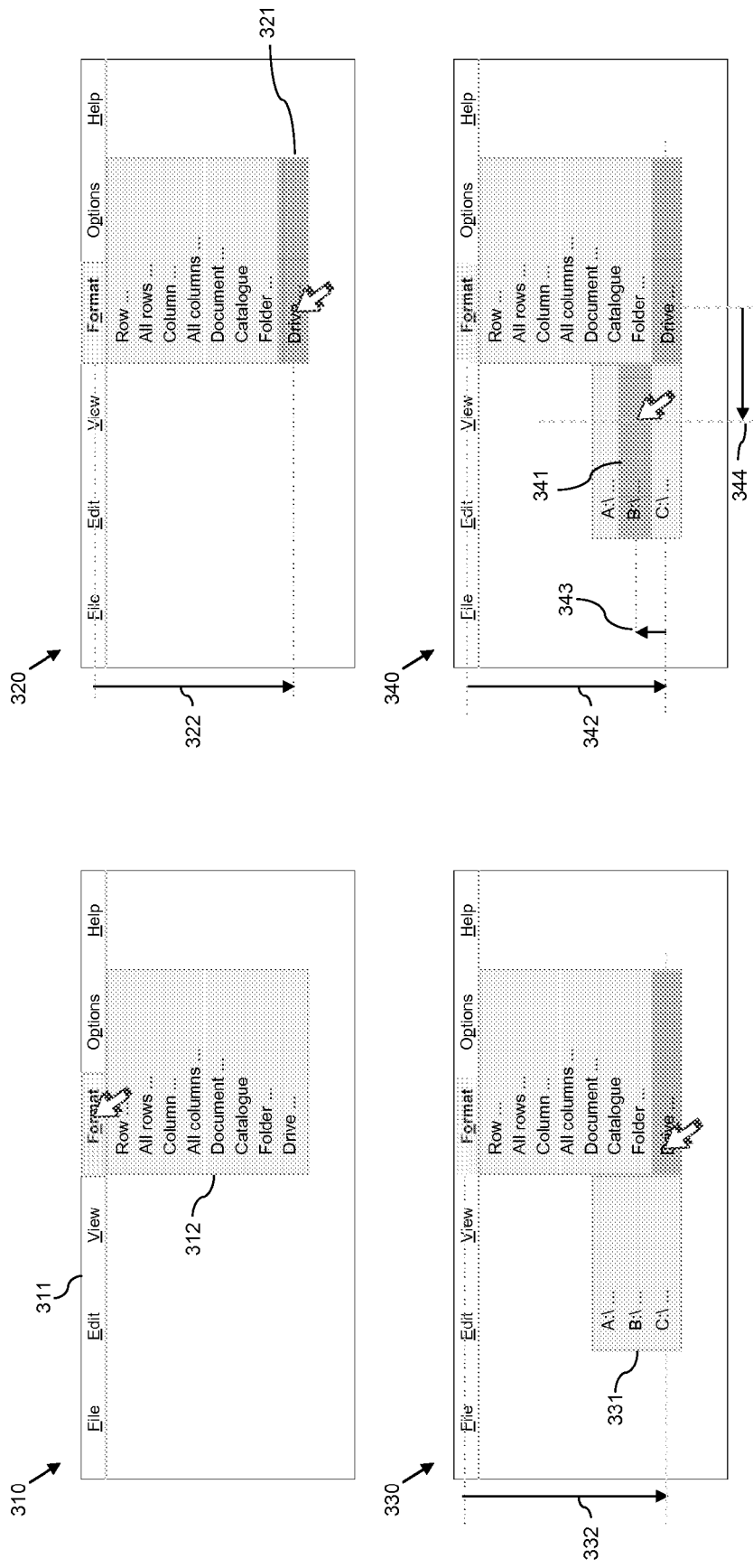
FIG. 3 represents a set of four exemplary screen shots 310 to 340 illustrating another example of menu-driven user interfaces according to prior art, here for an item of the root-menu-list item with more subsequent menu items as compared to the root-menu-item chosen as chosen in FIG. 1.

FIG. 3 represents a set of four exemplary screen shots 310 to 340 illustrating another example of prior art. In this example, the selected item of the root-menu list features more subsequent menu items as compared to the root-menu-item selected in FIG. 1. The method for menu item display, menu tree navigation, and menu item selection is identical to that described in FIG. 1. The key difference to the example provided in FIG. 1 is that the root-menu item selected at the beginning of the navigation process is not at the edge of the screen. Rather, it is situated at a certain distance to both edges of the user interface screen. Amongst other things, this implies that the sub-menu list 331 may be expanded and displayed to the left of the menu list 312 instead of to its right as is illustrated in 130. The menu list 312 also contains more elements as compared to the menu list 112. This is relevant for the description of another embodiment of the present invention as FIG. 4 illustrates.

Figure 4:
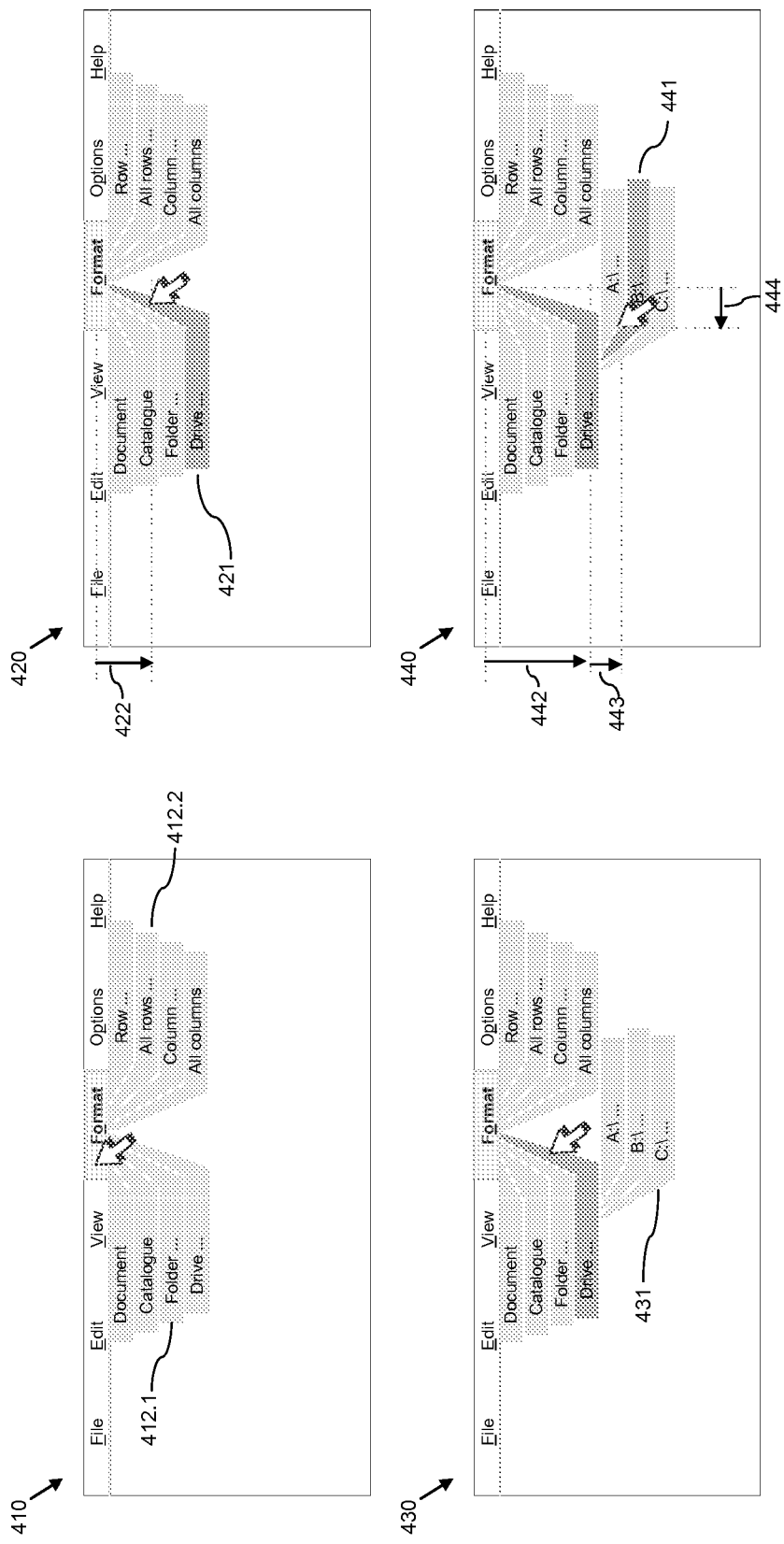
FIG. 4 represents a set of four exemplary screen shots 410 to 440 in accordance with an embodiment of the invention for another suitable context where a menu item list can expand to more than one side of the menu item selected.

FIG. 4 represents a set of four exemplary screen shots 410 to 440 illustrating the principal approach of the invention for another suitable context. In this example a root-menu item is selected that results in a menu list 412.1 and 412.2 being displayed. Together 412.1 and 412.2 count more items as in menu list 212. The selection of the root-menu item selected to both sides of the user interface screen allows for sub-menu lists 412.1 and 412.2 to expand to both sides of the selected root-menu item. The expansion of the menu list made up of 412.1 and 412.2 to both sides to form mirroring cascades of call-out shaped objects is another embodiment of the invention. The items included in 412.1 and 412.2 can be arranged to assemble a variety of other shapes, including a fan, a rotated pyramid or an arc, whereby the arrangement depends on the number of items to be displayed, the space available on the user-interface screen and pre-selected user-display preferences.

The distance that the user has to move the pointer in order to arrive at the desired item 421 is measured by 422. This is because the desired menu item can be selected by moving the pointer over the leading of the call-out 421. 422 is significantly shorter as compared to the distance as represented by 322 in FIG. 3, which the pointer has to be moved in order to select the desired menu item 321. In a similar way, if sub-menu item 341 in FIG. 3 is the desired item, the total distance that a user is required to move the pointer in order to select item 341 is measured by 342, 343 and 344. This total distance is significantly longer as compared to the total distance 442, 443 and 444, over which the pointer has to be moved in order to select sub-menu item 441 in FIG. 4. This highlights a key merit of the present invention.

Another merit that results from this embodiment is that the maximum number of items that can be displayed at once at any level of the menu tree below the root-menu is higher as compared to prior art, in particular, where screen space is limited. This is illustrated by comparing the visible menu item count of menu list 512.1 and 512.2 with the visible menu item count of menu list 612 in FIG. 6. In a similar way, a merit resulting from this embodiment is the reduced distance that a user has to move the pointer in order to select a desired item. This is illustrated by comparing the distance 642 and 643 in the example in FIG. 6 over which the pointer has to be moved in order to select desired item 641 to the much shorter distance 522 in order to select the desired item 523 in FIG. 5.

Figure 6:
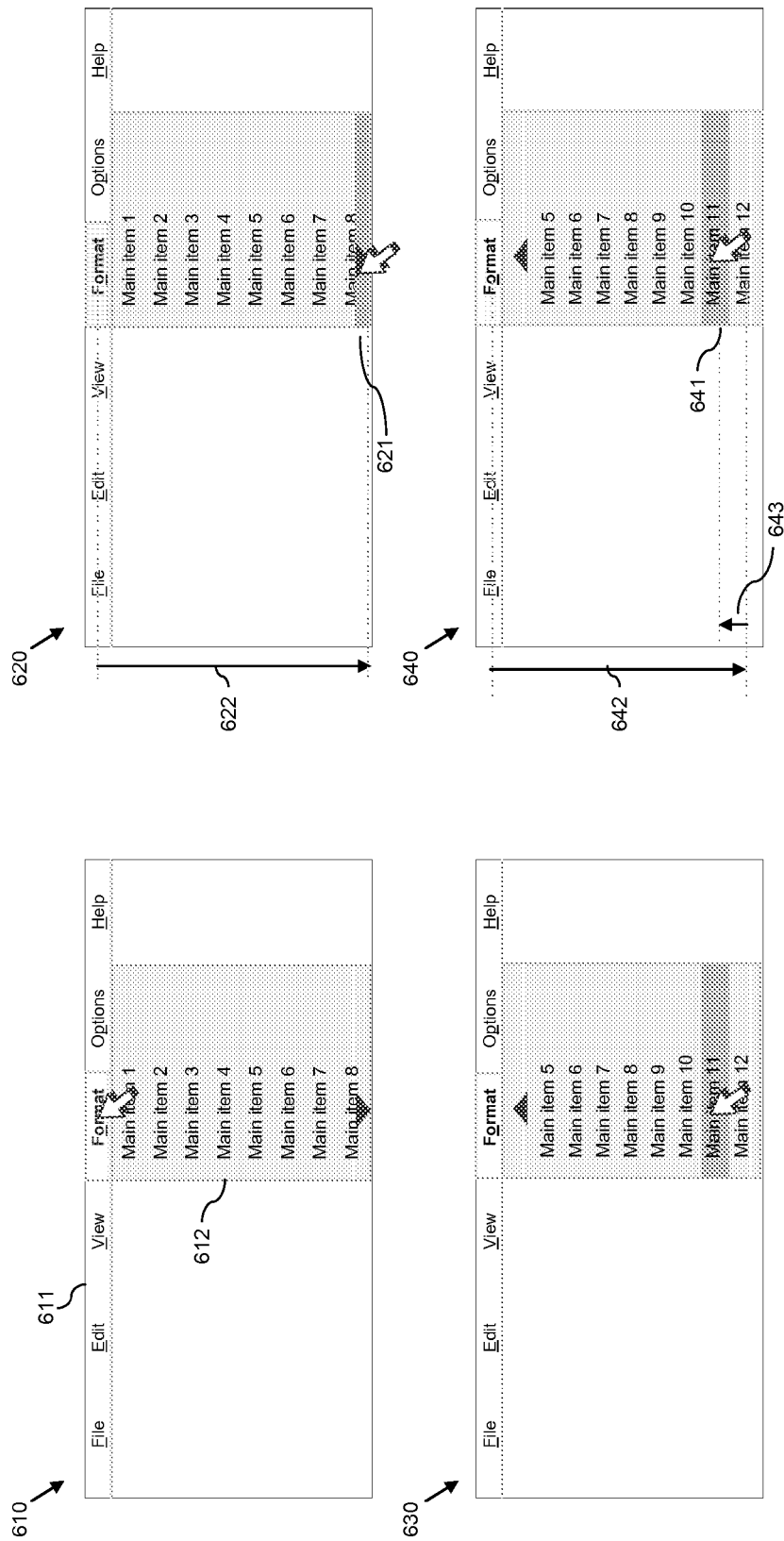
FIG. 6 represents a set of four exemplary screen shots 610 to 640 illustrating another example of menu-driven user interfaces according to prior art in relation to the maximum number of menu items that can be displayed on a user-interface screen.
Figure 7:
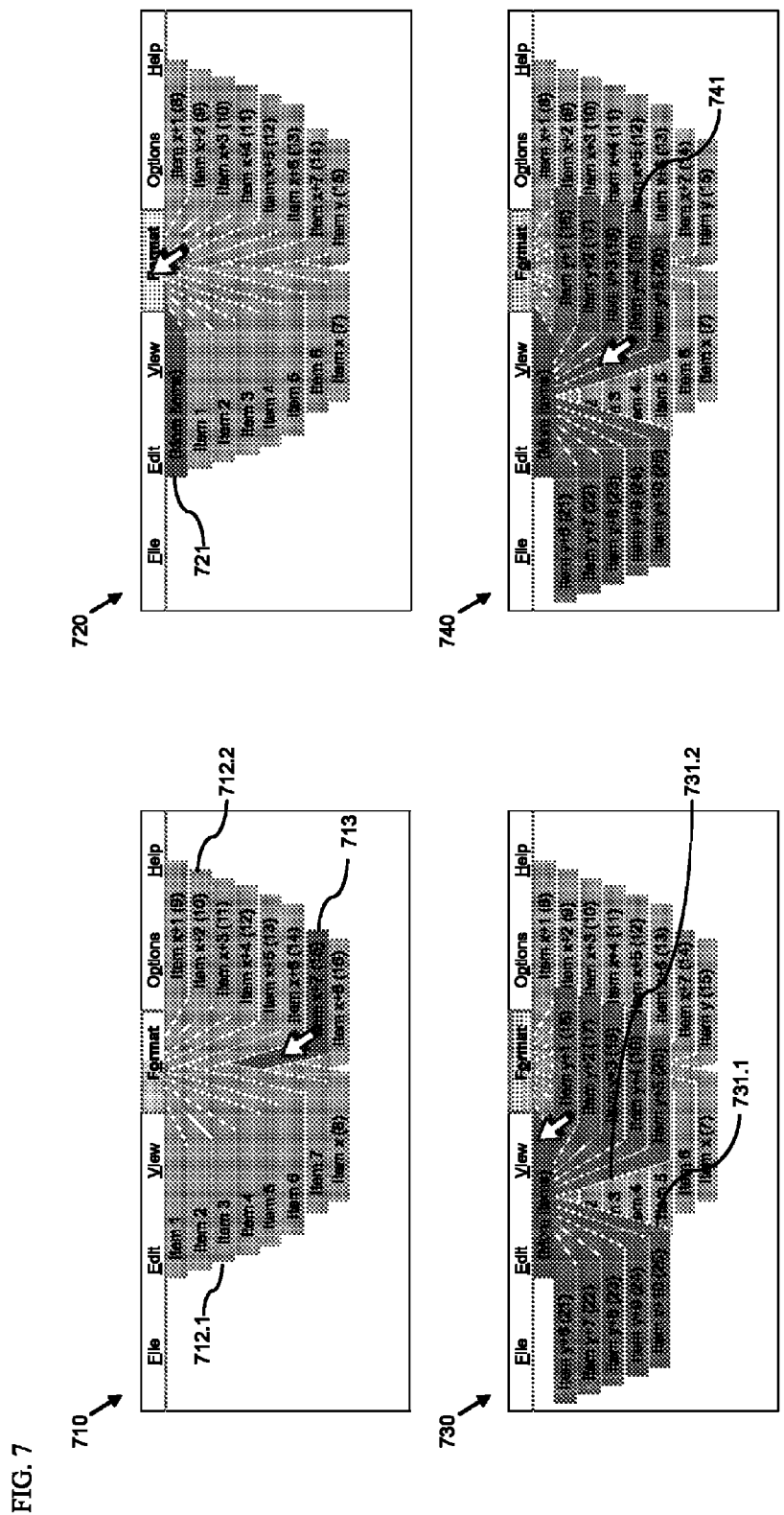
FIG. 7 represents a set of four exemplary screen shots 710 to 740 in accordance with an embodiment of the invention for another suitable context, in which a large number of menu items have to be displayed.

FIG. 7 further illustrates this merit for another suitable context. This figure represents a set of four exemplary screen shots 710 to 740 illustrating the principal approach of the invention for a suitable context in which a large number of menu items are displayed on limited screen space. This is to be compared to the prior-art example as provided in FIG. 6, which illustrates a context, in which a large number of menu items has to be displayed, and in which the user has to select a desired item 641. In such situations a position 621 at the far end of the menu list is reserved as a scroll-indicator in order to scroll-down the menu list to show more items, i.e. those items that cannot be shown on the screen due to limitations of the user interface screen. This prior art arrangement limits the number of items that can be displayed at once, i.e. without the need for further scrolling using the scroll-indicator 621. Those skilled in the art will recognize such an arrangement, for example from long lists of bookmarks in Internet browsing applications or extensive menu item lists in many application programs, and in extensive folder structures. The equivalent of this scroll-indicator 621, which is adopted to illustrate a merit of the present invention, is the placeholder menu item 721 in FIG. 7.

Having positioned the pointer over this placeholder menu item 721 and upon a user-initiated action, typically a left-click on the pointing device or the depressing of a suitable key on the keyboard, item lists 731.1. and 731.2 that cannot be displayed on the menu list 712.1 and 712.2 due to limited screen space, will be shown. The arrangement of these items can take a variety of forms including but not limited to an arc, a line or a cascade of items, resulting in a cascade, two mirroring cascades, a pyramid, a fan or an arc, etc., depending on the number of items to be displayed, the space available and predetermined, user-selected display preferences.

Figure 5:
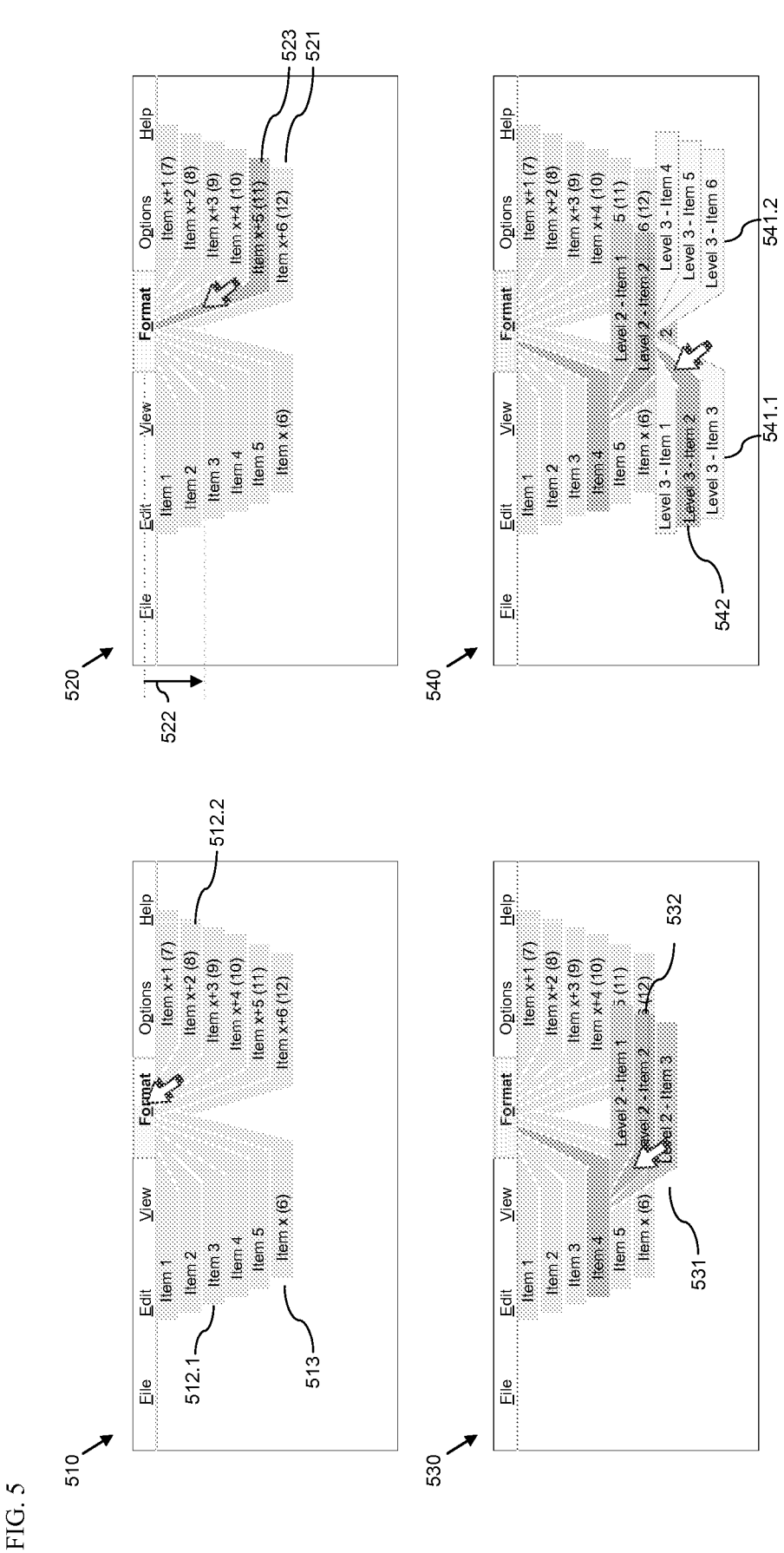
FIG. 5 represents a set of four exemplary screen shots 510 to 540 in accordance with an embodiment of the invention for another suitable context with more than 2 subsequent levels of menu item lists.

FIG. 5 represents a set of four exemplary screen shots 510 to 540 illustrating the principal approach of the invention for another suitable context with over more than 2 levels of subsequent menus below the root-menu. The expansion of a menu list to both sides at any level of the menu tree represents another embodiment of the present invention. This is illustrated by the menu lists made up of 512.1 and 512.2, and 541.1 and 541.2. In a suitable context this can be combined with a sub-menu list 531 expanding to only one side of the preceding selected menu item at any level in the menu tree. The merits resulting from this embodiment are twofold.

Firstly, this embodiment of the invention allows for a more efficient use of the screen space to display menu lists at various levels, where screen space is limited. From that follows the second merit, i.e. the ability to get to the desired menu item by means of a more efficient navigation within the menu tree as compared to prior art. This is because any item that has to be selected in order to get to the ultimate desired item can be selected by initiating a pre-determined user action such as depressing a button (usually a left-click) on the pointing device or a suitable key on the keyboard, once pointer of the pointing device is positioned over either the leading arm of a call-out or on the call-out bubble.

Figure 8:
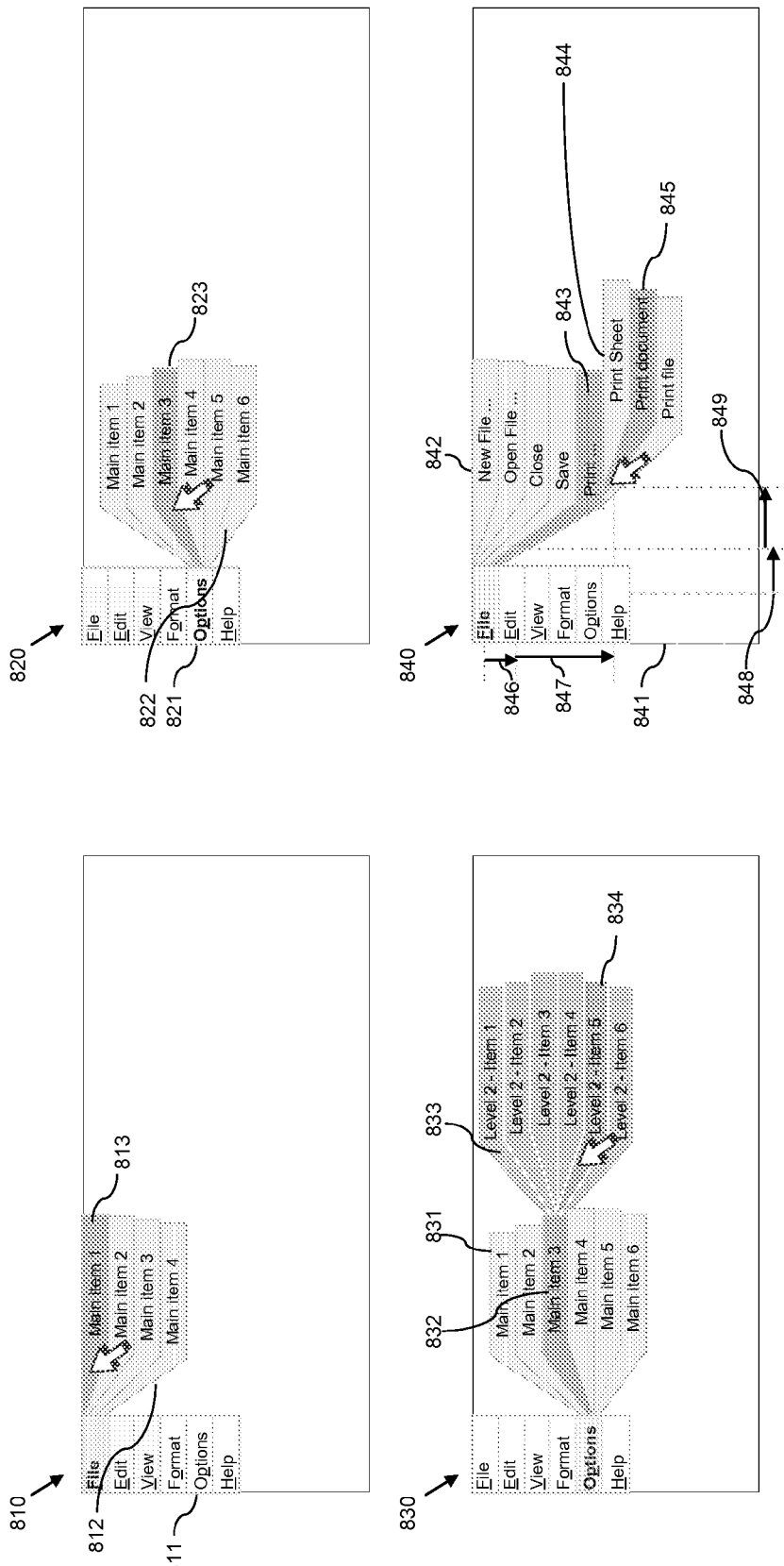
FIG. 8 represents a set of four exemplary screen shots 810 to 840 in accordance with an embodiment of the invention for another suitable context with a vertical root-menu.

FIG. 8 represents a set of four exemplary screen shots 810 to 840 illustrating the principal approach of the invention for another suitable context, in which a vertical root-menu 811 is being used instead of a horizontal root-menu 211 as shown in FIG. 2. The fact that the present invention can be used for horizontal as well as vertical root-menus represents another embodiment of the present invention.

For vertical root-menus, as shown in FIG. 8, the principles of the method and program of the present invention apply as they do with horizontal root-menus. That is, menu items below the root-menu are displayed as call-out shaped objects, and menu item lists are displayed as sets of call-out shapes. Depending on the number of items to be displayed, the space available on the user-interface screen and pre-selected user-display preferences such sets of call-outs can take the shape of an upward or downward cascade, double cascades, an upside-down stepped pyramid or a fan, amongst many others. Further, a desired sub-menu item can be selected by positioning the pointer over either the call-out bubble representing the desired menu item or over its leading arm, followed by initiating a pre-determined user action such as a left-click operation using the pointing device or by depressing a suitable key on the keyboard. Finally, such sets call-out shapes can be used at any menu level below the root-menu. This embodiment of the present invention yields the same merits as they do for horizontal root-menus. These merits are twofold.

Firstly, menu trees can be navigated more efficiently as compared to prior art, as measured by a reduced distance over which a user has to move the pointer in order to select a desired menu item at the various levels in a menu tree. This is illustrated by 840 as compared to 940. The distance that the pointer has to be moved in order to select the desired sub-menu item 843 is equivalent to the total of 846 and 848. This compares to the total of 922 and 923 in FIG. 9 in order to select the same desired menu item 921 applying prior art.

Figure 9:
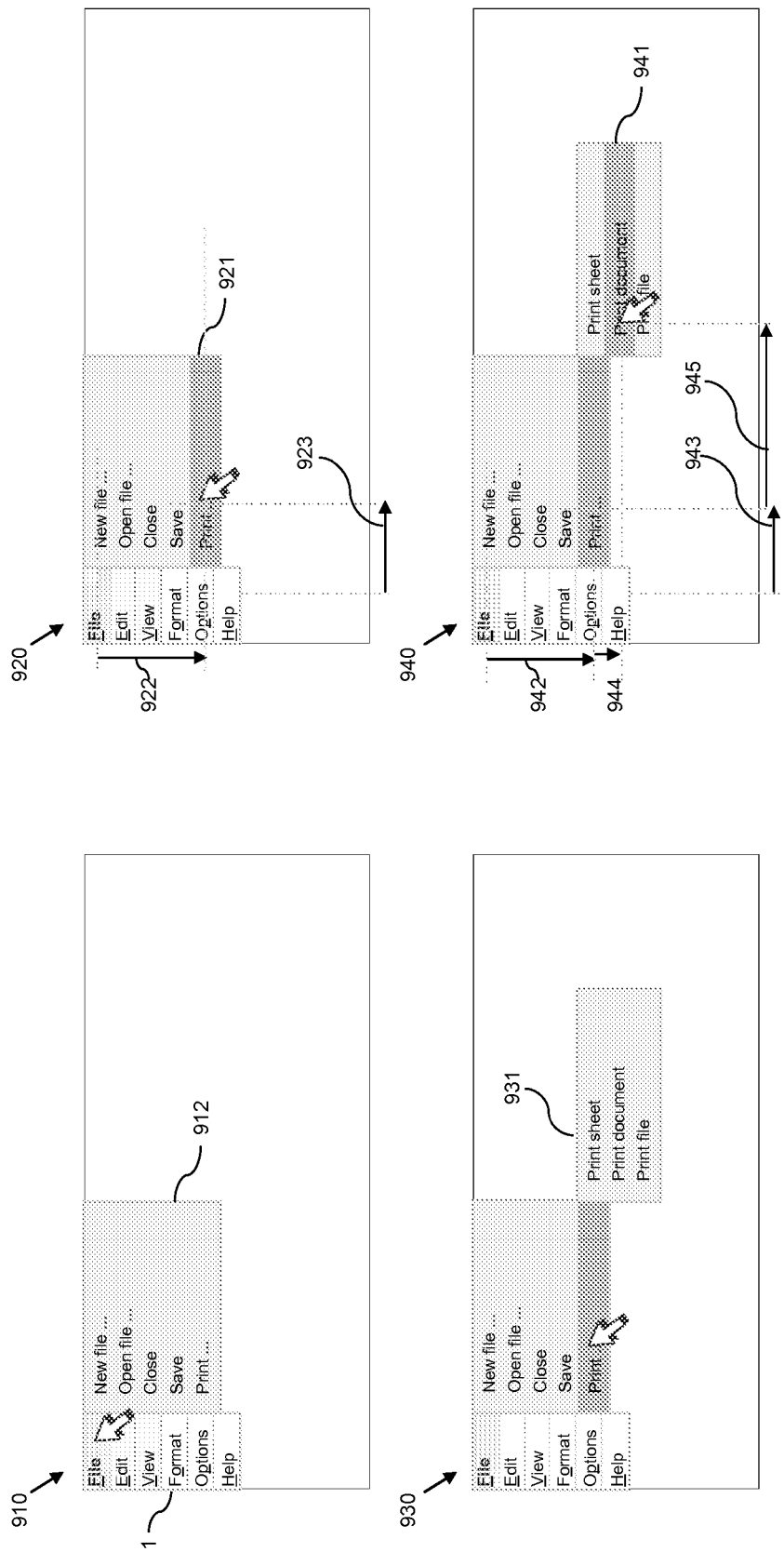
FIG. 9 represents a set of four exemplary screen shots 910 to 940 illustrating menu-driven user interfaces using vertical root-menus according to prior art.

FIG. 9 represents a set of four exemplary screen shots 910 to 940 illustrating prior art of menu-driven user interfaces using vertical root-menus. Attention is drawn to the desired sub-menu item 941, which is situated on a second level sub-menu list 931. The distance that the user has to move the pointer in order to select the desired item 941 is made up of the total of 942, 943, 944 and 945. Applying the principles of the present invention, as shown in FIG. 8 and described above, the distance that the user has to move the pointer in order to select the desired 845, which is made up of the total of 846, 848, 847 and 849, is significantly shorter.

Secondly, those skilled in the art will easily recognize, that this embodiment of the present invention also allows for a more efficient use of screen space, as it allows for more menu items to be displayed on a screen with limited screen space in a variety of suitable contexts. This is illustrated by 830 in FIG. 8 for the present invention, and by 1030 and 1040 in FIG. 10 for current art.

Figure 10:
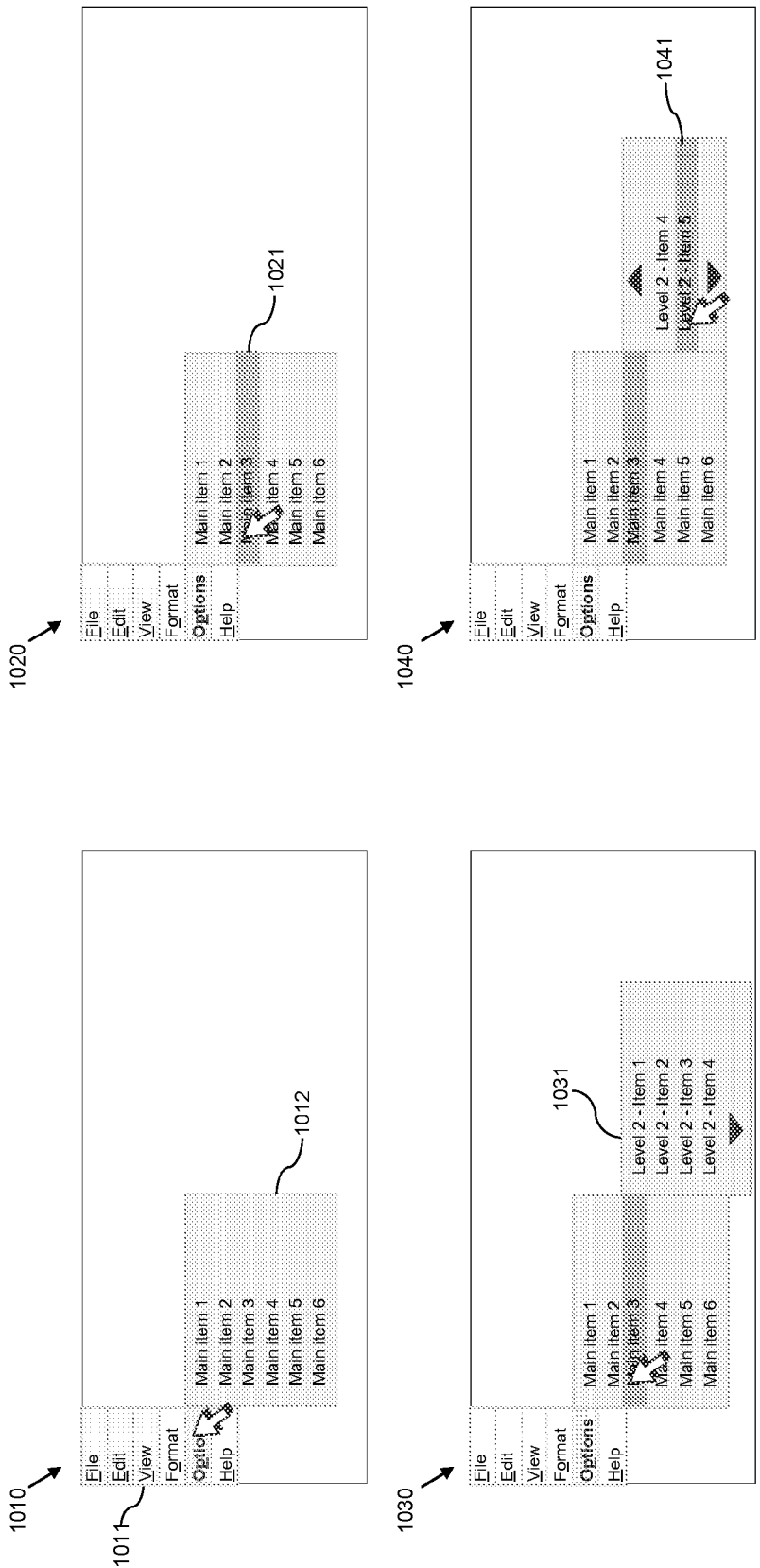
FIG. 10 represents a set of four exemplary screen shots 1010 to 1040 illustrating menu-driven user interfaces using vertical root-menus and illustrating the maximum number of menu items that can be displayed on a screen according to prior art.

FIG. 10 represents a set of four exemplary screen shots 1010 to 1040 illustrating prior art of menu-driven user interfaces using vertical root-menus and illustrating the maximum number of second subsequent level menu items that can be displayed on a screen.

Figure 11:
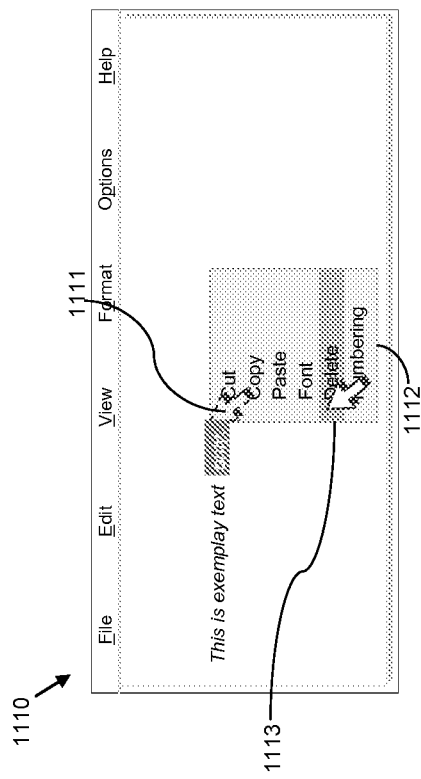
FIG. 11 represents an exemplary screen shot 1110 illustrating menu-driven user interfaces using context menus according to prior art.

FIG. 11 represents an exemplary screen shot 1110 according to prior art in relation to menu-driven user interfaces using context menus.

Figure 12:
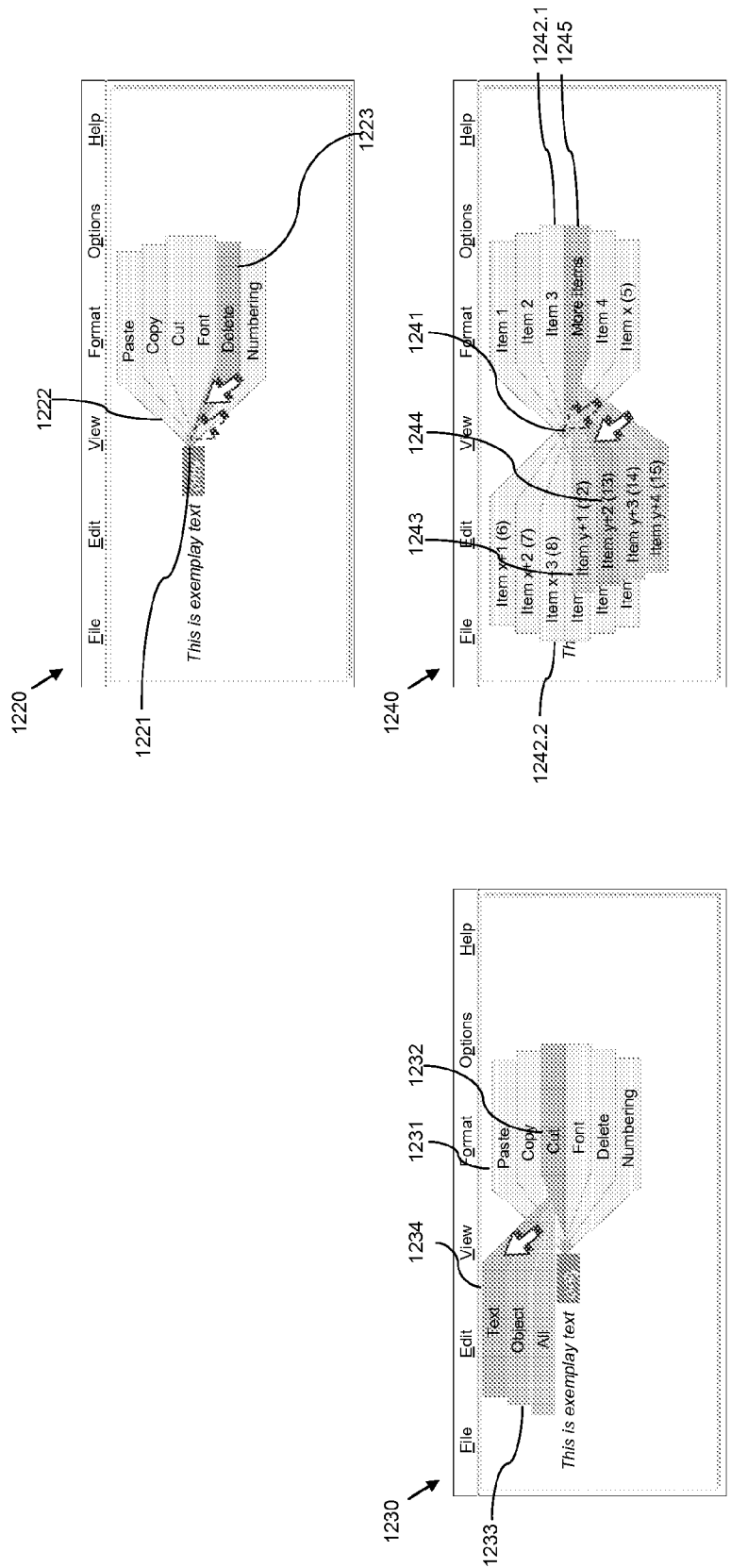
FIG. 12 represents a set of three exemplary screen shots 1220 to 1240 in accordance with an embodiment of the invention for another suitable context of menu-driven user interfaces using context menus.

FIG. 12 represents a set of three exemplary screenshots 1220 to 1240 illustrating the principal approach of the present invention for menu-driven user interfaces using context menus.

In prior art in FIG. 11, a context menu 1112 is displayed at the current position 1111 of the pointer upon a pre-determined user-initiated action, typically a right-click operation on the pointing device. Those skilled in the art will also recognize that one or more reference points may be displayed on the user-interface screen to indicate the existence of a context menu in relation to the application program-specific context. In these cases, a context menu is displayed upon a user-initiated action, typically a left- or right-click using the pointing device on any one of these reference points.

The items included in the context menu 1112 can depend on the pointer's current position 1111 and/or the application program-specific context. The user can select a desired item 1113 of the menu list 1112 by positioning the pointer over this item, followed by a pre-determined user-initiated action, typically a left-click on the pointing device or the depressing of a suitable key on the computer-system's keyboard. This may execute a context-specific function, application, pop-up window or result in another, subsequent menu list (sub-menu list) being displayed.

1220 in FIG. 12 illustrates the first principal embodiment of the present invention as described above in relation to FIG. 2, but in another suitable context, in which context menus are used instead of horizontal or vertical root-menu bars. That is, menu items are displayed as call-out shaped objects, each made up of a call-out bubble and a leading arm. The leading arm links the call-out bubble with the higher-level menu item selected by the user, or as shown in 1220, with the current position of the pointer 1221 or any geometrically shaped object 1221 representing a reference point as shown in 1220.

The second principal embodiment of the present invention is also illustrated in 1220 in FIG. 12. This is represented by the fact that any menu item can be selected by moving the pointing device over either the call-out leader or over the call-out bubble, followed by a pre-determined user action, such as depressing a button on the pointing device or the depressing of a suitable key on the computer-system's keyboard. In 1220, the desired item to be selected is represented by 1223.

Call-out shapes can be used at any level of a context menu's menu tree as illustrated in 1230 and 1240 in FIG. 12. Menu items, represented by call-out shaped objects, can be displayed to any side of the pointer's current position, or geometrically shaped reference point 1221, depending on the space available on the user interface screen, the number of items to be displayed and pre-set user preferences. Sets of call-out shapes can be arranged to form an arc, an upward or downward cascade, double cascades, an upside-down stepped pyramid or a fan, amongst many others. If the menu list contains more items than can be shown at once and if the desired item 1244 is not included in neither 1242.1 and 1242.2, a placeholder 1245 can be inserted, which upon selection by the user, reveals more menu items 1243 including the desired item 1244.

A software application implementing the method and program consistent with the present invention may be written in any programming language. Any such application may be part of an operating system, software application program or applet for use on a computer system with graphical man-machine user interface, a pointing device and a keyboard.

The foregoing description of the embodiments of the invention has been presented for the purpose of illustration and description. It is in no way exhaustive and not intended to be exhaustive nor does it limit the invention to the precise form disclosed as above. Many modifications and variations are possible in light of the above teaching. The scope of the invention is therefore not limited by this detailed description, but rather by the claims appended hereto.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for providing one or more menu items that form at least a primary menu item list and a secondary menu item list on a user interface screen displayed on a display device, the method being implemented by one or more data processors and comprising:
   receiving a selection of a reference item on the user-interface screen from a pointing device;
   displaying on the user interface screen the primary menu item list in a form of one or more primary call-out shaped objects representing one or more primary menu items, wherein each primary call-out shaped object comprises a call-out bubble and a leading arm protruding from the call-out bubble, the leading arm connecting the call-out bubble with the reference item displayed on the user interface screen, wherein the call-out bubble and the leading arm of each primary call-out shaped object are selectable to select a corresponding represented primary menu item;
   receiving a selection of the leading arm and/or the call-out bubble of a desired item of the primary menu item list, wherein the desired item of the primary menu item list represents the secondary menu item list;
   displaying on the user interface screen the secondary menu item list in the form of one or more secondary call-out shaped objects representing one or more secondary menu items, wherein each secondary call-out shaped object comprises a call-out bubble and a leading arm protruding from the call-out bubble, wherein the leading arm of each secondary menu item connects the secondary menu item with the desired item of the primary menu item list, and wherein the call-out bubble and the leading arm of each secondary call-out shaped object are selectable to select a corresponding represented secondary menu item;
   receiving a selection of the leading arm and/or the call-out bubble of a desired secondary menu item of the secondary menu item list, wherein the leading arm of the desired secondary menu item connects the desired secondary menu item with the desired item of the primary menu item list; and
   executing a function in response to the selection of the leading arm and/or the call-out bubble of the desired secondary menu item;
   wherein the at least one data processor is capable of determining a position for displaying at least one call-out shaped object, based on the number of call-out shaped objects to be displayed, the space available around a currently selected call-out shaped object, the space available on the user interface screen, and/or pre-determined display preferences.

2. The method of claim 1, wherein the reference item is one of:
   a menu item of a root menu item list; or
   any other context-dependent reference item indicating one or more options that the user can chose from in relation to the reference point.

3. The method of claim 1, wherein the selection of the reference item, the selection of the leading arm and/or the call-out bubble of the desired primary menu item, or the selection of the leading arm and/or the call-out bubble of the desired secondary menu item comprises:
   depressing a button on the pointing device; and/or
   depressing a key on a keyboard.

4. The method of claim 1, wherein two or more call-out shaped objects are displayed as a linear list, as an upward or downward cascade, as double cascades, as an upside-down stepped pyramid, as a fan, and/or as an arc.

5. The method of claim 1, wherein a function associated with at least one primary menu item comprises execution of an application, opening a pop-up window, and/or displaying at least one call-out shape representing a secondary menu item of the at least one primary menu item.

6. The method of claim 1, wherein a call-out bubble of a respective menu item contains a text label and/or a symbol indicating a specific application, function, pop-up window, and/or sub-menu that the respective menu item represents.

7. The method of claim 1, comprising displaying a plurality of menu items at one or more levels of one or more hierarchical menu trees as sets of respective call-out shaped objects, each set of call-out shaped objects representing a menu item list.

8. The method of claim 1, further comprising:
   receiving user-generated input immediately upon a user-initiated action, by allowing the pointer of the pointing device to focus on the leading arm and/or the call-out bubble of a call-out shaped object.

9. The method of claim 1, further comprising:
   displaying a description of a menu item of a hovered-over menu item, if the pointing device hovers over the leading arm and/or the call-out bubble of the respective call-out shape shaped object.

10. The method of claim 1, further comprising:
    highlighting a call-out shape if the leading arm and/or the call-out bubble of the call-out shape is focused on, hovered over, and/or selected.

11. The method of claim 1, further comprising:
    collapsing a selected path of a menu tree except for a root menu bar or initial reference item, which may be displayed permanently, following a selection of an ultimately desired menu item.

12. The method of claim 1, further comprising:
    determining the space available to all sides of a selected primary menu item in a primary menu item list for displaying a corresponding secondary menu item list; and inserting a call-out shaped placeholder menu item in the primary menu item list at a position closest to the selected primary menu item, if the number of menu items to be displayed in the corresponding secondary menu item list exceeds the number of call-out shaped objects that can be shown at once, and/or if the number of menu items to be displayed exceeds the display boundaries of the user interface screen.

13. The method of claim 1, wherein a highest level menu or root-menu is displayed as a horizontal root-menu bar, as a vertical root-menu bar, as a context menu, and/or as a reference item.

14. A non-transitory computer readable storage medium comprising program instructions for providing one or more menu items that form a menu item list and at least one subsequent menu list on a user interface screen displayed on a display device, wherein the program instructions are executable to:
    receive a selection of a reference item on the user-interface screen from a pointing device;
    display on the user interface screen the primary menu item list in a form of one or more primary call-out shaped objects representing one or more primary menu items, wherein each primary call-out shaped object comprises a call-out bubble and a leading arm protruding from the call-out bubble, the leading arm connecting the call-out bubble with the reference item displayed on the user interface screen, wherein the call-out bubble and the leading arm of each primary call-out shaped object are selectable to select a corresponding represented primary menu item;
    receive a selection of the leading arm and/or the call-out bubble of a desired item of the primary menu item list, wherein the desired item of the primary menu item list represents the secondary menu item list;
    display on the user interface screen the secondary menu item list in the form of one or more secondary call-out shaped objects representing one or more secondary menu items, wherein each secondary call-out shaped object comprises a call-out bubble and a leading arm protruding from the call-out bubble, wherein the leading arm of each secondary menu item connects the secondary menu item with the desired item of the primary menu item list, and wherein the call-out bubble and the leading arm of each secondary call-out shaped object are selectable to select a corresponding represented secondary menu item;
    receive a selection of the leading arm and/or the call-out bubble of a desired secondary menu item of the secondary menu item list, wherein the leading arm of the desired secondary menu item connects the desired secondary menu item with the desired item of the primary menu item list; and
    execute a function in response to the selection of the leading arm and/or the call-out bubble of the desired secondary menu item;
    wherein the program instructions are further executable to:
        determine a position for displaying at least one call-out shaped object, based on the number of call-out shaped objects to be displayed, the space available around a currently selected call-out shaped object, the space available on the user interface screen, and/or predetermined display preferences.

15. The non-transitory computer readable storage media of claim 14, wherein the reference item is one of:
    a menu item of a root menu item list; or
    any other context-dependent reference item indicating one or more options that the user can chose from in relation to the reference point.

16. The non-transitory computer readable storage media of claim 14, wherein the selection of the reference item, the selection of the leading arm and/or the call-out bubble of the desired primary menu item, or the selection of the leading arm and/or the call-out bubble of the desired secondary menu item comprises:
    depressing a button on the pointing device; and/or
    depressing a key on a keyboard.

17. The non-transitory computer readable storage media of claim 14, wherein two or more call-out shaped objects are displayed as a linear list, as an upward or downward cascade, as double cascades, as an upside-down stepped pyramid, as a fan, and/or as an arc.

18. The non-transitory computer readable storage media of claim 14, wherein a function associated with at least one menu item comprises execution of an application, opening a pop-up window, and/or displaying at least one further call-out shape representing a secondary menu item of the at least one menu item.

19. The non-transitory computer readable storage media of claim 14, wherein a call-out bubble of a respective menu item contains a text label and/or a symbol indicating a specific application, function, pop-up window, and/or sub-menu that the respective menu item represents.

20. A method for providing one or more menu items that form at least a primary menu item list and a secondary menu item list on a user interface screen displayed on a display device, the method being implemented by one or more data processors and comprising:
    receiving a selection of a reference item on the user-interface screen from a pointing device;
    displaying on the user interface screen the primary menu item list in a form of one or more primary call-out shaped objects representing one or more primary menu items, wherein each primary call-out shaped object comprises a call-out bubble and a leading arm protruding from the call-out bubble, the leading arm connecting the call-out bubble with the reference item displayed on the user interface screen, wherein the call-out bubble and the leading arm of each primary call-out shaped object are selectable to select a corresponding represented primary menu item;
    receiving a selection of the leading arm and/or the call-out bubble of a desired item of the primary menu item list, wherein the desired item of the primary menu item list represents the secondary menu item list;
    displaying on the user interface screen the secondary menu item list in the form of one or more secondary call-out shaped objects representing one or more secondary menu items, wherein each secondary call-out shaped object comprises a call-out bubble and a leading arm protruding from the call-out bubble, wherein the leading arm of each secondary menu item connects the secondary menu item with the desired item of the primary menu item list, and wherein the call-out bubble and the leading arm of each secondary call-out shaped object are selectable to select a corresponding represented secondary menu item;
    receiving a selection of the leading arm and/or the call-out bubble of a desired secondary menu item of the secondary menu item list, wherein the leading arm of the desired secondary menu item connects the desired secondary menu item with the desired item of the primary menu item list; and executing a function in response to the selection of the leading arm and/or the call-out bubble of the desired secondary menu item;

wherein the method further comprises:
- determining the space available to all sides of a selected primary menu item in the primary menu item list for displaying a corresponding secondary menu item list; and
- inserting a call-out shaped placeholder menu item in the primary menu item list at a position closest to the selected primary menu item, if the number of menu items to be displayed in the corresponding secondary menu item list exceeds the number of call-out shaped objects that can be shown at once, and/or if the number of menu items to be displayed exceeds the display boundaries of the user interface screen.

21. A non-transitory computer readable storage medium comprising program instructions for providing one or more menu items that form a menu item list and at least one subsequent menu list on a user interface screen displayed on a display device, wherein the program instructions are executable to:

receive a selection of a reference item on the user-interface screen from a pointing device;

display on the user interface screen the primary menu item list in a form of one or more primary call-out shaped objects representing one or more primary menu items, wherein each primary call-out shaped object comprises a call-out bubble and a leading arm protruding from the call-out bubble, the leading arm connecting the call-out bubble with the reference item displayed on the user interface screen, wherein the call-out bubble and the leading arm of each primary call-out shaped object are selectable to select a corresponding represented primary menu item;

receive a selection of the leading arm and/or the call-out bubble of a desired item of the primary menu item list, wherein the desired item of the primary menu item list represents the secondary menu item list;

display on the user interface screen the secondary menu item list in the form of one or more secondary call-out shaped objects representing one or more secondary menu items, wherein each secondary call-out shaped object comprises a call-out bubble and a leading arm protruding from the call-out bubble, wherein the leading arm of each secondary menu item connects the secondary menu item with the desired item of the primary menu item list, and wherein the call-out bubble and the leading arm of each secondary call-out shaped object are selectable to select a corresponding represented secondary menu item;

receive a selection of the leading arm and/or the call-out bubble of a desired secondary menu item of the secondary menu item list, wherein the leading arm of the desired secondary menu item connects the desired secondary menu item with the desired item of the primary menu item list; and execute a function in response to the selection of the leading arm and/or the call-out bubble of the desired secondary menu item;

wherein the program instructions are further executable to:
- determine the space available to all sides of a selected primary menu item in the primary menu item list for displaying a corresponding secondary menu item list; and
- insert a call-out shaped placeholder menu item in the primary menu item list at a position closest to the selected primary menu item, if the number of menu items to be displayed in the corresponding secondary menu item list exceeds the number of call-out shaped objects that can be shown at once, and/or if the number of menu items to be displayed exceeds the display boundaries of the user interface screen.

* * * * *